2 Sheets—Sheet 1.

C. A. KING.
Potato-Digger.

No. 223,147. Patented Dec. 30, 1879.

WITNESSES:
Achilles Schehl
C. Sedgwick

INVENTOR:
C. A. King
BY Munn & Co
ATTORNEYS.

N. PETERS, PHOTO-LITHOGRAPHER, WASHINGTON, D. C.

2 Sheets—Sheet 2.

C. A. KING.
Potato-Digger.

No. 223,147. Patented Dec. 30, 1879.

WITNESSES:
Achilles Schehl.
C. Sedgwick

INVENTOR:
C. A. King
BY
Munn & Co
ATTORNEYS.

UNITED STATES PATENT OFFICE.

CHARLES A. KING, OF CHESHIRE, OHIO, ASSIGNOR TO HIMSELF AND HENRY W. RESENER, OF SAME PLACE.

IMPROVEMENT IN POTATO-DIGGERS.

Specification forming part of Letters Patent No. 223,147, dated December 30, 1879; application filed April 5, 1879.

*To all whom it may concern:*

Be it known that I, CHARLES AUGUSTUS KING, of Cheshire, in the county of Gallia and State of Ohio, have invented a new and useful Improvement in Potato-Diggers, of which the following is a specification.

Figure 1:
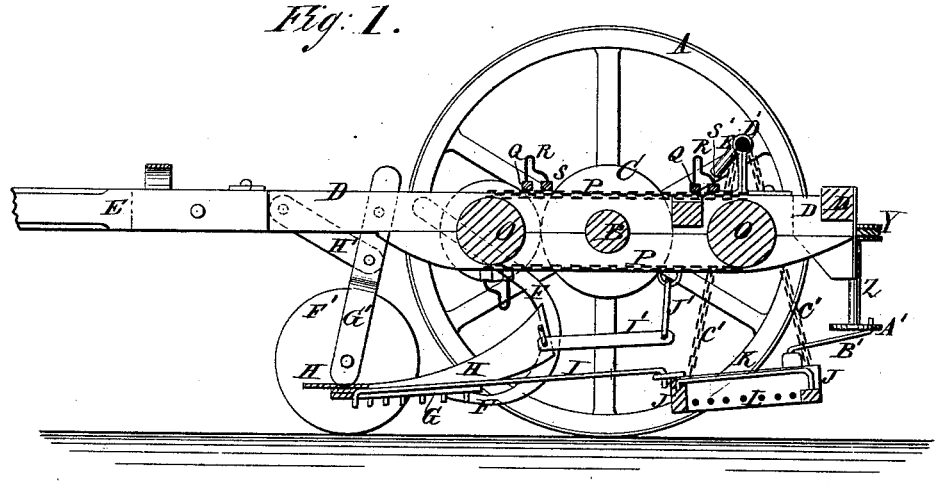
Figure 2:
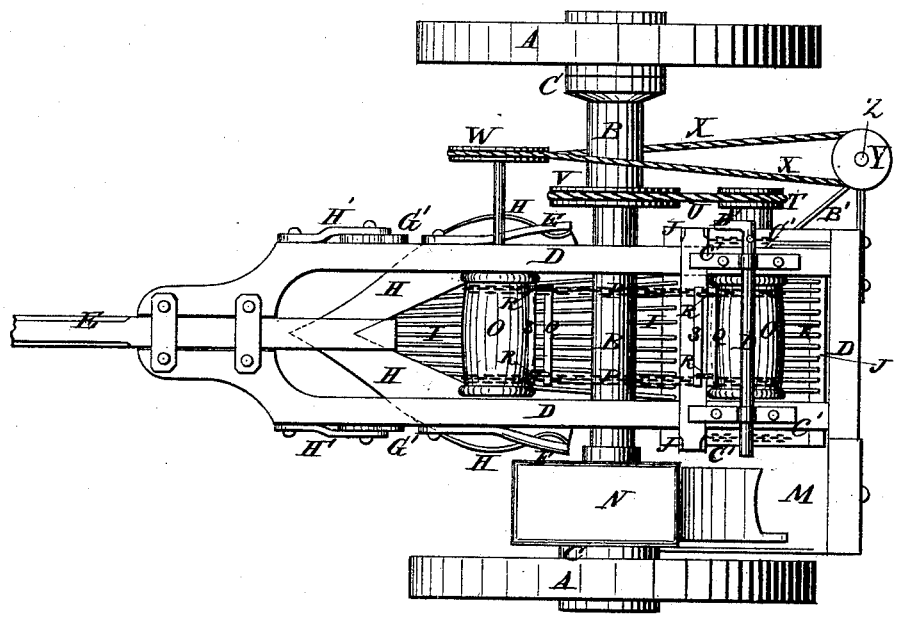
Figure 3:
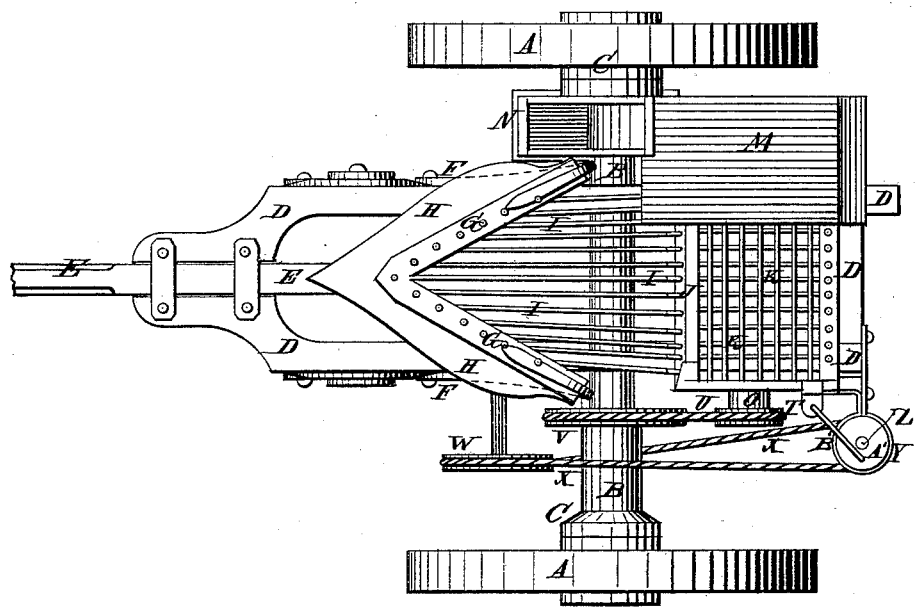
Figure 4:
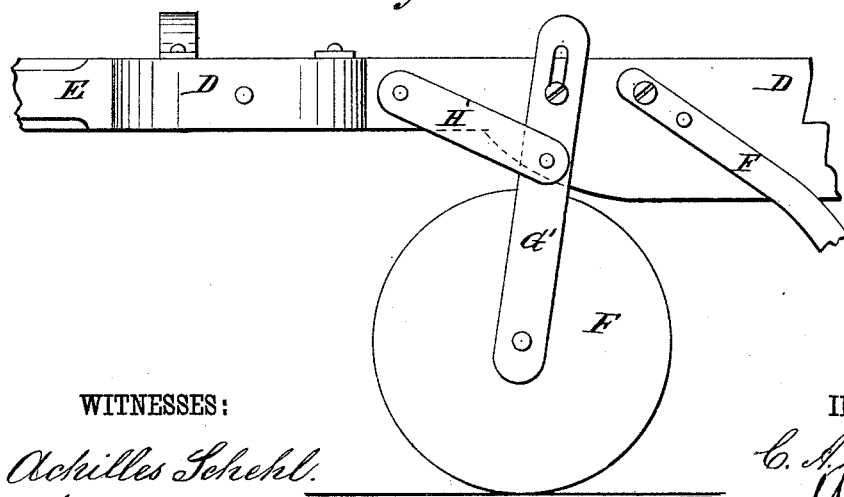

Figure 1, Sheet 1, is a vertical longitudinal section of my improved potato-digger. Fig. 2, Sheet 1, is a top view of the same. Fig. 3, Sheet 2, is a bottom view of the same. Fig. 4, Sheet 2, is a side view of the forward part of the frame, the cutter, and its standard enlarged.

Similar letters of reference indicate corresponding parts.

The object of this invention is to furnish an improved machine for digging potatoes which shall be so constructed as to dig the potatoes, separate them from dirt, clods, &c., and deposit them in a box or basket, and which shall be simple in construction, convenient in use, and reliable and effective in operation.

The invention consists in the combination of the curved beams, the V-shaped bar, the V-shaped plow, having the ends of its arms twisted upward, the two sets of longitudinal wires, the set of cross-wires, the frame or box, and the receiving-box, with each other and with the frame and the wheels and axle; and in the endless chain, provided with teeth secured to the rigid cross-bar and to the loose bar, whose ends rest upon the said chain, but are not attached thereto, in combination with the frame, the rollers, and the screens, as hereinafter more fully described.

A represents the wheels, which are placed upon the journals of the axle B, and are connected with the said axle by pawls and ratchet-wheels C, so that the said wheels, when turned forward, may carry the said axle with them, but may be turned back without turning the said axle.

The axle B revolves in bearings attached to the frame D, to the forward end of which, or to hounds attached to the said frame, is pivoted a tongue, E, in such a way that it may have a vertical but no lateral play.

To the sides of the frame D are rigidly attached the upper ends of the beams F, which are curved downward and forward, and their lower ends are attached to the arms of a V-shaped bar or plate, G.

To the bar G is attached the plow-plate H, which is also made V-shaped, and has the rear parts of its arms twisted upward to serve as guards, to prevent the potatoes, soil, clods, &c., from passing off at the sides.

Into holes in the V-shaped bar G are hooked the forward ends of a series of wires, I, which are placed parallel with each other, and at such a distance apart that the potatoes cannot drop through between them. The rear ends of the wires I are hooked into the upper edge of the front bar of the frame J of the separating-box.

Into the upper edges of the front and rear bars of the frame J are hooked the ends of the wires K, which are placed parallel with each other in line with the wires I, and at such a distance apart that the potatoes can drop through between them, while the clods, stalks, grass, &c., will pass along the said wires and drop from their rear ends to the ground.

One of the side bars of the frame J is made low, and to it and to the lower edge of the other side bar are attached the ends of the wires L, which are placed parallel with each other, and at such a distance apart that the potatoes cannot pass through between them. The wires L should be slightly inclined, so that the potatoes may slide from them into the box M, which serves as a receiving-box, and as an elevator as well.

N is the casing of the elevator, which is hung from the axle B, and discharges the potatoes into a box or basket attached to the machine to receive them. The receiving box or basket and the elevator belt and buckets are not shown in the drawings.

To the side bars of the frame D are pivoted rollers, drums, or pulleys O, around which pass endless chains P.

To the chains P, at suitable distances apart, are attached the ends of cross-bars Q, to which are attached the ends of the straight arms of the angular teeth R. The other or brace arms of the teeth R are bent, as shown in Fig. 1, and their ends are attached to the loose cross-bars S, the ends of which rest upon but are not attached to the chains P, so as to allow the teeth sufficient yield to prevent them from being broken.

To a journal of one of the rollers O is attached a pulley, T, around which passes an endless chain, U. The chain U also passes around a pulley, V, attached to the axle B.

With this construction, as the machine is drawn forward the potatoes, clods, stalks, grass, weeds, &c., will be carried back along the wires I K, the soil dropping through the wires I, the potatoes dropping through the wires K and passing to the box M, and the clods, stalks, grass, weeds, &c., being swept off at the rear ends of the wires K.

To the journal of one of the rollers O is attached a pulley, W, around which passes an endless chain, X. The chain X also passes around a pulley, Y, attached to the upper end of a short vertical shaft, Z, which revolves in bearings attached to the rear corner of the frame D, and to the lower end of which is attached a crank or crank-wheel, A'.

To the crank or crank-wheel A' is pivoted the end of the connecting-rod B', the other end of which is pivoted to the frame J.

By this construction, as the machine is drawn forward the screens and separating-box will be shaken, so that all the loose dirt may be shaken off before the potatoes pass to the receiving-box M.

To the corners of the frame J are attached the lower ends of chains C', the upper ends of which are attached to a shaft, D'. The shaft D' revolves in bearings attached to the frame D, and to one of its ends is attached, or upon it is formed, a crank, E', so that by turning the said shaft D' the screens may be raised and lowered to adjust them at any desired height.

F' are rotary cutters, which are placed at the opposite sides of the forward part of the plow H, and are pivoted to the lower ends of the standards G'. The upper parts of the standards G' are slotted to receive the bolts by which the said standards are secured to the side bars of the frame D, so that the cutters F' may be raised and lowered as may be desired. The cutters F' are designed to cut off stalks, weeds, grass, roots, &c., at the sides of the rows of hills, and also to serve as a gage for regulating the depth to which the plow H enters the ground.

The draft-strain upon the cutters F' and the standards G' is sustained by the brace-bars H', the lower ends of which are attached to the said standards G', and their upper ends are attached to the side bars of the frame D. The potatoes are kept from falling off at the sides of the screens while passing back along the wires I by the guard or fender plates I', the forward ends of which are connected with the ends of the arms or wings of the plow H, and their rear ends are suspended from the frame D by rods J', as shown in Fig. 1.

Having thus described my invention, I claim as new and desire to secure by Letters Patent—

1. The combination of the curved beams F, the V-shaped bar G, the V-shaped plow H, having the ends of its arms twisted upward, the two sets of longitudinal wires I K, the former pivoted to the plate G and to the forward part of the plate J, the set of cross-wires L, the frame or box J, and the receiving-box M, with each other and with the frame D and the wheels and axle A B, substantially as herein shown and described.

2. The endless chain P, provided with the teeth R, secured to the rigid cross-bar Q and to the loose bar S, whose ends rest upon the said chain, but are not attached thereto, in combination with the frame D, the rollers O, and the screens I K L, substantially as herein shown and described.

CHARLES A. KING.

Witnesses:
 HARRY WOOD,
 WARREN ECKMAN.